United States Patent [19]

Christensen et al.

[11] Patent Number: 4,869,770
[45] Date of Patent: Sep. 26, 1989

[54] METHOD AND APPARATUS FOR LAMINATING COMPOSITE MATERIALS

[75] Inventors: Stephen Christensen, Issaquah; Dale E. Hartz, Renton, both of Wash.

[73] Assignee: The Boeing Company, Seattle, Wash.

[21] Appl. No.: 128,147

[22] Filed: Dec. 3, 1987

[51] Int. Cl.⁴ ............................................. B32B 31/20
[52] U.S. Cl. .................................. 156/286; 156/382; 156/497
[58] Field of Search ............... 156/381, 382, 285, 286, 156/87, 583.3, 497, 289

[56] References Cited

U.S. PATENT DOCUMENTS

| | | | |
|---|---|---|---|
| 2,380,573 | 7/1945 | Beasecker | 156/382 |
| 3,146,148 | 8/1964 | Mitchella | 156/382 |
| 4,065,340 | 12/1977 | Dickerson | 156/286 |
| 4,073,674 | 2/1978 | Hortel | 156/286 |
| 4,216,047 | 8/1980 | Hilliard | 156/285 |
| 4,622,091 | 11/1986 | Leherman | 156/87 |

Primary Examiner—George F. Lesmes
Assistant Examiner—J. Davis
Attorney, Agent, or Firm—Seed and Berry

[57] ABSTRACT

An improved method and apparatus for preventing buckling of thermoplastic composite laminates during an autoclaving process. Edge strips are placed around the periphery of the laminate to prevent the vacuum bag of the autoclave from making contact with the edges of the laminate when the autoclave is pressurized. As a result, the vacuum bag is prevented from imparting inwardly directed forces to the edges of the laminate which could otherwise cause the laminate to buckle.

3 Claims, 4 Drawing Sheets

METHOD AND APPARATUS FOR LAMINATING COMPOSITE MATERIALS

STATEMENT OF GOVERNMENT INTEREST

This invention was made with Government support under F33657-86-C-2085, awarded by the U.S. Air Force. The Government has rights in this invention.

TECHNICAL FIELD

This invention relates to a method and apparatus for laminating composite sheets in an autoclave, and more particularly, to a method and apparatus for preventing the thermoplastic composite sheets from wrinkling during the autoclaving procedure.

BACKGROUND ART

Aircraft structures have traditionally been manufactured primarily of such metals as aluminum, titanium and steel alloys. However, the current trend is to manufacture many previously metal structures from composite materials such as carbon fibers impregnated with an appropriate resin. The particular resin chosen causes the composite material to be either thermoplastic or thermosetting. Thermoplastic composite materials become soft and pliable when heated so that they may be repeatedly reformed by heating. Thermosetting composite materials are normally pliable before they have been heated. However, they are cured by the application of heat. Thus, once thermosetting composite materials have been exposed to heat, they permanently lose their pliability.

Composite materials used to fabricate aircraft structures—whether they be thermoplastic or thermosetting—are normally available in relatively thin sheets or tapes having their fibers extending in a single direction. These unidirectional sheets or tapes are normally stacked several layers deep in order to increase the thickness and hence strength of the resulting composite structure. Also, the angular orientation of the fibers in each layer can be selected to tailor the strength characteristics of the structure in each direction. For example, by orienting the fibers in most of the layers in a longitudinal direction, a composite structure can be made stronger longitudinally than it is transversely.

As mentioned above, the process of laminating sheets of composite materials begins with the stacking of the composite sheets to form a laminate. The sheets are stacked on a tool or mold having a surface that conforms to the desired shape of the composite structure. When the sheets are initially stacked, the laminate is substantially thicker than the finished product because of the presence of air gaps in the laminate resulting from waviness in the composite sheets. The laminate is compressed to the thickness of the finished product and formed into an integral mass through the combined application of heat and pressure. If the tool on which the laminate is placed is flat, the pressure may sometimes be applied with a conventional press. However, it is often necessary for the composite structure to have a complex curvature. Under these circumstances, it would be necessary to machine the surface of the tool to this complex curvature, to machine the contour of the pressure plate of the press to exactly match the complex curvature of the tool, and to then position the pressure plate and tool in exact registration with each other. It is very difficult and hence expensive to produce a press that can meet these requirements, especially where the size of the composite structure is large, thus requiring a large press. Conventional presses may also be inadequate even if the surface of the tool is completely flat. It is important that the pressure on the laminate be relatively constant. However, variations in the thickness of individual sheets in the laminate can make the laminate thicker in some areas. As a result, the pressure that the press applies to the laminate will be greater in these areas. Similarly, the pressure on the laminate will also be less in areas where localized variations in the thickness of the sheets make the laminate relatively thin in some areas. Thus conventional presses may be inadequate even where the tool is flat and the pressure plate of the press is also perfectly flat and positioned parallel to the tool during the laminating process.

The above-described limitations of conventional presses for use in the laminating process have led to the widespread use of autoclaves to laminate composite sheets. In autoclave processing of composite sheets, a predetermined number of sheets are stacked on a tool having the desired shape of the composite structure. A porous breather cloth, such as a Fiberglas® cloth, is placed over the laminate. The breather cloth is then covered by an air-impermeable sheet, and the edges of the air-impermeable sheet are sealed to the surface of the tool so that the air-impermeable sheet, in combination with the tool, forms a vacuum bag. Air is generally evacuated from a vacuum port in the tool so that the pressure differential between the interior and exterior of the bag is reflected as a pressure exerted on the laminate. The laminate and vacuum bag assembly is then placed in an autoclave. The autoclave is basically a closed container that is heated and pressurized. The pressure differential between the evacuated interior of the vacuum bag and the pressurized autoclave consolidates the laminate, while the heat causes the composite sheets in the laminate to adhere to each other to form a unitary structure. It is important to recognize that autoclave processing of composite laminates avoids the two above-described limitations of conventional presses. First, the pressure applied to the laminate will be constant regardless of the surface contour of the tool. Thus composite structures having complex curvatures may be manufactured easily. Second, the pressure applied to the laminate will be constant regardless of variations in the thickness of individual sheets in the laminate.

Although there are many advantages to using autoclaves to laminate composite structures, there are also some problems. When the vacuum bag is evacuated during the autoclaving process, the vacuum can draw resin from out of the laminate at its edges. Two approaches have been developed to deal with this problem. First, a nonstructural, resin-impermeable dam has been placed around the laminate in contact with its edges. Such dams have generally been fabricated from cork or wood. The dam, by contacting the edges of the laminate, prevents the flow of resin from the edges of the laminate. The second solution to the resin bleed problem has been to delay the evacuation of the vacuum bag for a predetermined period after heat has been applied to the laminate. Heat causes the viscosity of the resin in the laminate to increase. After the viscosity has increased sufficiently, the resin will not flow from the laminate when the vacuum is applied.

A second problem encountered in processing composite laminates with an autoclave is wrinkling or buckling of the laminate. This phenomena appears to be caused by transverse pressure that the vacuum bag exerts on the edges of the laminate during the consolidation process when the thickness of the laminate is being reduced from its unconsolidated thickness to the thickness of the final structure. The problem does not occur with composite materials using thermosetting resins. It is believed that the heat applied to the laminate prior to consolidation causes curing of thermosetting composite materials so that they are not sufficiently pliable to wrinkle or buckle during consolidation. Thus the problem remains unsolved only with autoclave processing of thermoplastic composite materials. Furthermore, the problem appears to be more serious with the higher autoclave pressures used to process relatively large and/or complex thermoplastic composite structures.

DISCLOSURE OF THE INVENTION

It is an object of the invention to provide a method and apparatus for laminating thermoplastic composite materials that prevents the laminate from wrinkling or buckling during the autoclave process.

It is another object of the invention to provide an autoclave for laminating thermoplastic composites without buckling that utilizes most of the components of conventional autoclaves.

It is still another object of the invention to provide an autoclave procedure for laminating thermoplastic composites without buckling that can be operated by anyone who is capable of operating a conventional autoclave.

It is a further object of the invention to provide an autoclave for laminating thermoplastic composites without buckling that can easily be adapted to fabricate laminates having a wide variety of shapes and sizes.

These and other objects of the invention are provided by a method and apparatus for laminating composite sheets to form a composite structure using an autoclave. A processing assembly includes a tool having a working surface on which the laminate is placed and an air-impermeable sheet sealed to the tool around the laminate so that the sheet and tool form an airtight vacuum bag that is preferably evacuated prior to the autoclaving procedure. The processing assembly is then placed in an autoclave to consolidate the laminate and form it into a unitary structure. In order to prevent buckling of the laminate as it is consolidated in the autoclave, edge strips are placed adjacent the edges of the laminate and secured to the tool or to each other so that the edge strips remain relatively stationary with respect to the laminate. The strips resist the inward force that the air-impermeable sheet would otherwise exert on the laminate when the vacuum bag is evacuated and the autoclave is pressurized. The edge strips are spaced apart from the adjacent edge of the laminate by a gap that is too narrow to allow the air-impermeable sheet to force itself into the gap but wide enough to maintain each of the edge strips spaced apart from the adjacent edge of the laminate in the event of any inward deflection of the edge strip when the autoclave is pressurized. The edge strips preferably have a height that is greater than or equal to the consolidated thickness of said laminate, and a thickness-to-height ratio of at least three so that the strips have sufficient stiffness to resist the inward force exerted on the edge strips by the autoclave pressure without significant inward deflection.

BEST MODE FOR CARRYING OUT THE INVENTION

Figure 1:
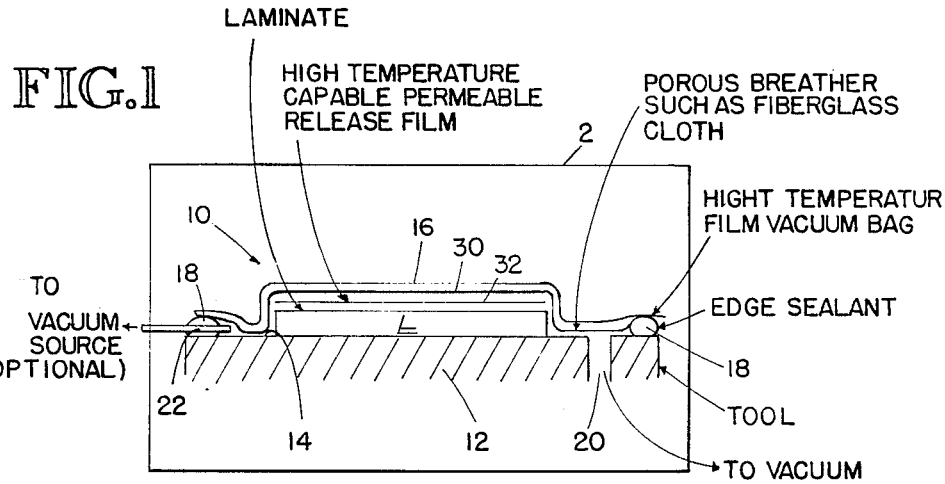
FIG. 1 is a schematic view of a conventional autoclave shown in operation processing a composite laminate.

A conventional autoclave 2 is illustrated in schematic form in FIG. 1. As mentioned above, such autoclaves are conventionally used to apply heat and pressure to composite laminates to cause the laminates to consolidate and form a unitary composite structure. A processing assembly 10, including a tool 12 of steel or some other suitable material and having a working surface 14, is placed in the autoclave 2. Sheets of conventional composite materials are stacked on the working surface 14 of the tool 12 to form a laminate L. In its original form, the laminate L has an unconsolidated thickness that is substantially greater than the final thickness of the consolidated laminate that forms the composite structure. The working surface 14 is illustrated in FIG. 1 as being planar, but it should be understood that the contour of the working surface 14 is more commonly curved, and often in a complex manner.

The processing assembly 10 also includes an air-impermeable sheet 16 of conventional design that covers the entire laminate L. The sheet 16 is sealed at its edges around the laminate L by a conventional edge seal 18. The air-impermeable sheet 16 and tool 12 thus form an airtight vacuum bag. The tool 12 also includes a vacuum port 20 located within the vacuum bag beneath the air-permeable sheet 16. A conventional vacuum pump (not shown) is normally connected to the vacuum port 20 to evacuate the vacuum bag prior to or during the autoclaving process. A second vacuum port 22 extending through the edge seal 18 may also be used to evacuate the vacuum bag. When the vacuum bag is evacuated and the autoclave 2 is pressurized, the pressure differential between the inside and the outside of the vacuum bag causes the sheet 16 to apply a compressive force to the top and sides of the laminate L.

Evacuating the vacuum bag prior to placing the processing assembly 10 in the autoclave holds the composite sheets in the laminate L in position as the processing assembly 10 is placed in the autoclave 2. Removing the air from the vacuum bag prior to placing the assembly 10 in the autoclave also lessens the volume of air that the autoclave 2 must force out of the bag during processing. Thus it is highly desirable to evacuate the vacuum bag prior to the autoclaving process. However, the process can be performed without previously evacuating the vacuum bag as long as the vacuum bag is vented to atmosphere when the autoclave 2 is pressurized.

It is generally desirable for the processing assembly 10 to include an air-permeable breather cloth 30 of conventional design to cover the laminate L. The breather cloth 30 allows the air to flow more easily beneath the air-impermeable sheet 16 to facilitate the quick and even evacuation of the vacuum bag. An air-permeable release film 32 of conventional design should be positioned between the breather cloth 30 and the laminate L. The release film 32 is made from or coated with a chemically inert material, such as Teflon ®. The release film 32 prevents the breather cloth 30 from sticking to the laminate L at the end of the autoclaving process. Both the release film 32 and the breather cloth 30 must be fabricated of a material that is capable of withstanding the high temperatures of the autoclaving process.

Figure 2:
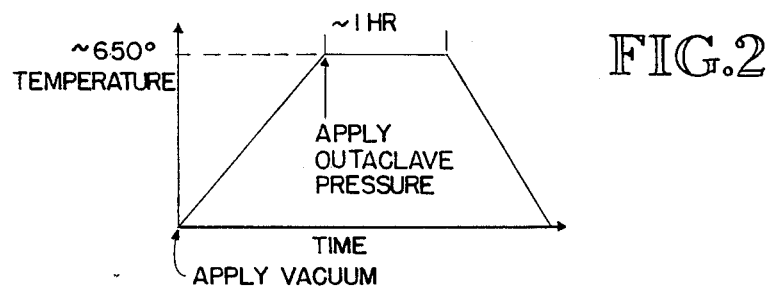
FIG. 2 is a graph of the application of temperature and pressure as a function of time in prior art autoclaves and in the inventive autoclave.

As mentioned above, the autoclave 2 of FIG. 1 includes a conventional heater (not shown) for heating the laminate L as it is compressed when the vacuum bag is evacuated and the autoclave 2 is pressurized. The operating cycle of the autoclave 2 is illustrated in FIG. 2. At the start of the processing cycle, the vacuum bag is preferably evacuated and the laminate L is gradually heated until its temperature has increased to a maximum of 650° F. When the temperature of the laminate L reaches 650° F., the autoclave 2 is pressurized to about 185 psig, thereby applying a compressive force to the top and the edges of the laminate L. Once the autoclave 2 is pressurized, the vacuum bag can be vented to atmosphere, although the vacuum can also be maintained all during the autoclaving process. The temperature remains at 650° F. and the autoclave pressure remains at 185 psig for about 1 hour. After about 1 hour, the laminate L is allowed to gradually cool. When the laminate L has cooled sufficiently so that the resin in the laminate L has hardened, the autoclave 2 may be depressurized; and if the vacuum bag has not already been vented, it can be vented at this time. The air-impermeable sheet 16, breather cloth 30 and release film 32 are then removed from the laminate L, and the laminate L in the form of the finished composite structure is removed from the working surface 14 of the tool 12.

The compressive force that the air-impermeable sheet 16 exerts on the laminate L when the autoclave 2 is pressurized acts on the laminate L in all directions. Thus, in addition to the downward force exerted on the upper surface of the laminate L, the sheet 16 also exerts inward forces on the edges of the laminate L. It is believed that these inward forces can cause the laminate to buckle, thereby making the resulting composite structure unsuitable for its intended use. As mentioned above, this buckling problem occurs only when thermoplastic composite laminates are being processed in an autoclave. The problem does not occur when thermosetting composite laminates are being processed because the heat applied to the laminate prior to consolidation appears to cause sufficient curing to prevent buckling.

Figure 3:
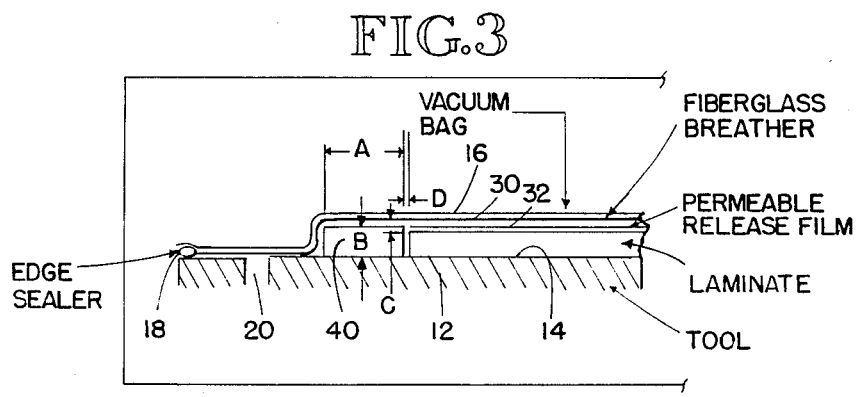
FIG. 3 is a schematic view showing the use of edge strips in an autoclave to prevent buckling of the composite laminate.
Figure 4:
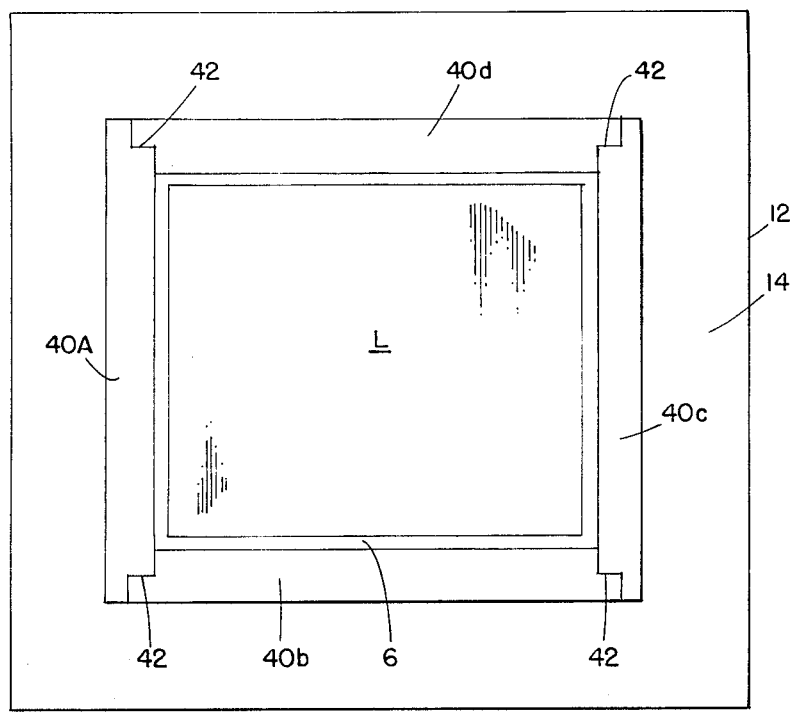
FIG. 4 is a partial top plan view of one embodiment of the edge strips used in the autoclave of FIG. 3.

One embodiment of an autoclave that can process composite laminates without causing them to buckle is illustrated in FIGS. 3 and 4. Most of the components of the autoclave 2 and processing assembly 10, including the tool 12, air-permeable sheet 16, edge seal 18, breather cloth 30, release film 32 and vacuum ports 20, 22, are common to the prior art autoclave 2 and processing assembly 10. Therefore, in the interests of clarity and brevity, these components have been given the same reference numerals in all of the figures. In order to prevent the compressive force exerted on the edges of the laminate L from buckling the laminate L, a plurality of substantially rigid edge strips 40 are placed around the laminate L. Notches 42 are formed at the ends of the edge strips 40 to allow the ends of the edge strips 40 to interfit with each other. The edge strips 40 protect the edges of the laminate L from the inward force exerted by the air-impermeable sheet 16 when the autoclave is pressurized. As a result, buckling of the laminate cannot occur.

The edge strips are spaced apart from the adjacent edges of the laminate L by a gap G. The gap G width "d" (FIG. 3) should be small enough that the air-impermeable sheet 16 cannot enter the gap when the autoclave 2 is pressurized. If the sheet 16 did enter the gap G during the autoclaving process, it would be able to exert an inward force on the edges of the laminate L and thus possibly buckle the laminate L. The gap G should also be sufficiently large that the inner surfaces of the edge strips 40 do not contact the edges of the laminate L if the edge strips 40 bow inwardly in response to the inward force exerted by the air-impermeable sheet 16. The magnitudes of the inwardly directed forces exerted on the edge strips 40 by the sheet 16 are proportional to the areas of the outer surfaces of the edge strips 40. The areas of the outer surfaces of the edge strips 40 are, in turn, proportional to their heights "b" (FIG. 3). For edge strips 40 supported only at their ends, their ability to resist these inward forces is proportional to their stiffness, which is, in turn, proportional to the cube of their widths "a" (FIG. 3). For best results, the edge strips 40 should have a width-to-height ratio (a/b) of at least 3; i.e., they should be at least three times wider than they are high. However, for edge strips 40 fabricated from materials having an extremely high modulus of elasticity or where the edge strips 40 are supported between their ends, this width-to-height ratio may not be important.

The height "b" (FIG. 3) of the edge strips 40 with respect to the consolidated thickness of the laminate L must also be considered. It is believed that buckling of thermoplastic composite laminates does not occur until the autoclave 2 is pressurized. Thus it is not necessary for the edge strips 40 to be as high as the unconsolidated thickness of the laminate L. Instead, the height "b" of the edge strips 40 should be equal to or greater than the consolidated thickness of the laminate L. If the height of the edge strips 40 is less than the consolidated thickness of the laminate L, the air-impermeable sheet 16 can contact the edges of the laminate L, either directly or through the intervening release film 32 and/or breather cloth 30, and thus cause buckling of the laminate L.

Figure 5:
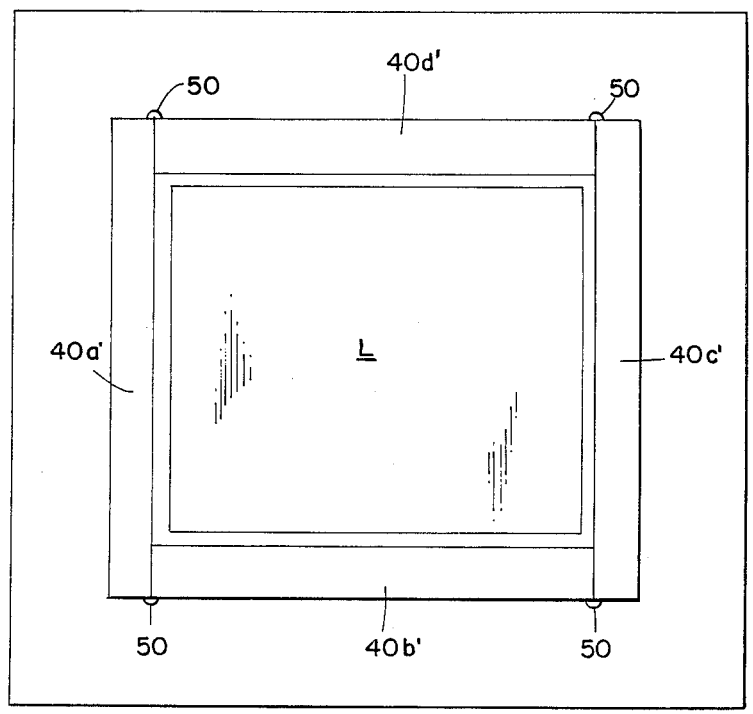
FIG. 5 is a partial top plan view of an alternative embodiment of the edge strips used in the autoclave of FIG. 3.

Although the embodiment of FIGS. 3 and 4 uses notches 42 to interconnect the edge strips 40, other interconnecting structures can be used. For example, as illustrated in FIG. 5, the edge strips 40' can be joined to each other by welds 50.

Figure 6:
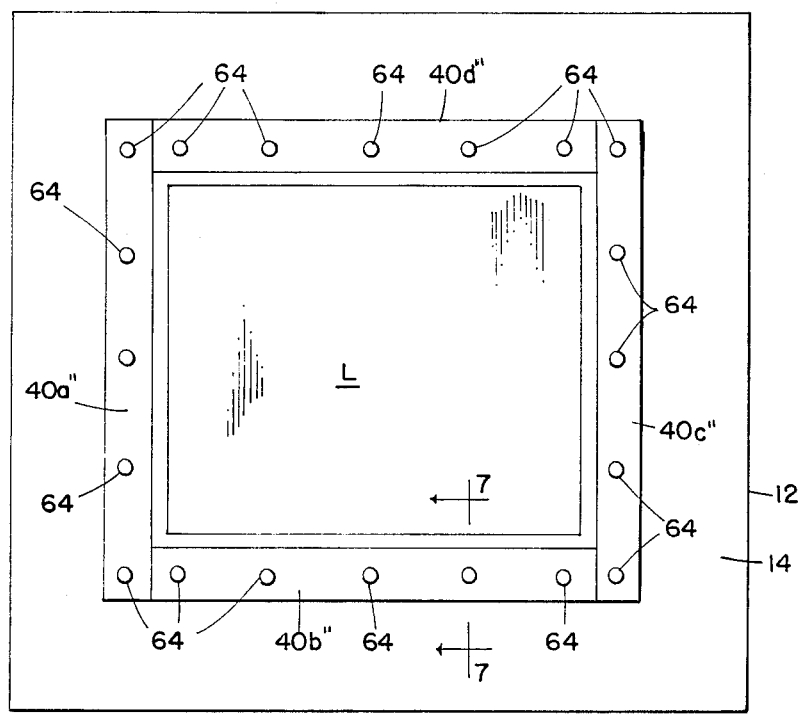
FIG. 6 is a partial top plan view of another embodiment of the edge strips used in the autoclave of FIG. 3.
Figure 7:
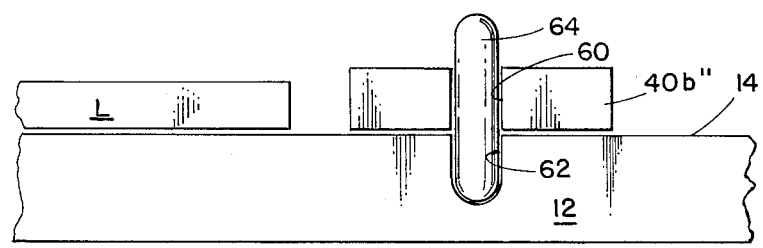
FIG. 7 is a cross-sectional view taken along the line 7—7 of FIG. 6.

As pointed out earlier, it is important that the edge strips 40, 40' be secured against movement with respect to the laminate L. The edge strips 40, 40' are restrained against relative movement in the embodiments of FIGS. 3, 4 and 5 by securing the edge strips 40, 40' to each other. However, the edge strips can also be restrained against movement by fastening the edge strips to the tool, as illustrated in FIGS. 6 and 7. In this latter embodiment, a plurality of aligned, spaced-apart bores 60, 62 are formed in the edge strips 40" and 12, respectively. A pin 64 is insert into each of the aligned bores 60, 62 to prevent any lateral movement of the edge strips 40". The embodiment of FIGS. 6 and 7 has the advantage that the edge strips 40" need not be as wide as those in the embodiments of FIGS. 3, 4 and 5 since they are supported throughout their lengths and thus do not have a tendency to bow inwardly in response to the inward force exerted by the air-impermeable sheet 16 when the autoclave 2 is pressurized.

The inventive method and apparatus for laminating composite materials thus prevent the laminate from wrinkling or buckling during the autoclave process using most of the components of conventional autoclaves. As a result, it can be operated by anyone who is capable of operating a conventional autoclave, and it can easily be adapted to fabricate laminates having a wide variety of shapes and sizes.

We claim:

1. A method of laminating composite sheets to form a composite structure, comprising:
   providing a tool having a working surface with a contour conforming to the desired configuration of said composite structure;
   stacking a plurality of said composite sheets on the working surface of said tool, thereby forming a laminate;
   placing an edge strip adjacent each edge of said laminate, said strips being secured so that they remain relatively stationary with respect to said laminate, each of said edge strips being spaced apart from the adjacent edge of said laminate by at least a first predetermined distance and by no more than a second predetermined distance, said edge strips having a width-to-height ratio of at least three;
   covering said laminate and said edge strips with an air-impermeable sheet and sealing said sheet to said tool around said laminate so that said sheet and tool form an airtight vacuum bag; and
   applying a differential pressure to said vacuum bag and applying heat to said laminate, thereby consolidating said laminate and forming said laminate into a unitary structure, said first predetermined distance being selected so that each of said edge strips remains spaced apart from its adjacent edge of said laminate in the event of any inward deflection of said edge strip when said differential pressure is applied, and said second predetermined distance being selected so that the gap between each of said edge strips and the adjacent edge of said laminate is too narrow to allow said air-impermeable sheet to force itself into said gap when said differential pressure is applied.

2. In a method of operating an autoclave to fabricate composite structures from a laminate of composite sheets, said autoclave including a tool having a working surface on which said laminate is placed and an air-impermeable sheet including means for sealing said sheet to said tool around said working surface so that said sheet and tool form an airtight vacuum bag, an improved method of operating said autoclave to prevent buckling of said laminate as it is consolidated in said autoclave, said method comprising placing an edge strip adjacent each edge of said laminate, said strips being secured so that they remain relatively stationary with respect to said laminate, each of said edge strips being spaced apart from the adjacent edge of said laminated by a gap that is too narrow to allow said air-impermeable sheet to force itself into said gap when said autoclave is pressurized but wide enough to maintain each of said edge strips spaced apart from the adjacent edge of said laminate in the event of any inward deflection of said edge strip when said autoclave is pressurized, said strips having a height that is greater than or equal to the consolidated thickness of said laminate and a width-to-height ratio of at least three so that strops have sufficient stiffness that they are able to resist the inward force exerted on said edge strips when said autoclave is pressurized.

3. An apparatus for fabricating composite structures from sheets of composite material, comprising:
   a tool having a working surface with a contour conforming to the desired configuration of said composite structure, said sheets of composite material being stacked on said working surface to form a laminate;
   a plurality of edge strips surrounding said laminate so that one of said edge strips is positioned adjacent each edge of said laminate, said strips being secured so that they remain relatively stationary with respect to said laminate, each of said edge strips being spaced apart from the adjacent edge of said laminate by at least a first predetermined distance and by no more than a second predetermined distance, said edge strips having a width-to-height ratio of at least three; an air impermeable sheet covering said laminate and said edge strips;
   means for sealing said air-impermeable sheet to said tool around said laminate so that said sheet and tool form an airtight vacuum bag; and
   an autoclave for applying a pressure to said vacuum bag and applying heat to said laminate, thereby consolidating said laminate and forming said laminate into a unitary structure, said first predetermined distance being selected so that each of said edge strips remains spaced apart from its adjacent edge of said laminate in the event of any inward deflection of said edge strip when said autoclave applies said pressure to said vacuum bag and said second predetermined distance being selected so that the gap between each of said edge strips and the adjacent edge of said laminate is too narrow to allow said air-impermeable sheet to force itself into said gap when said autoclave applies said pressure to said vacuum bag.

* * * * *

UNITED STATES PATENT AND TRADEMARK OFFICE
CERTIFICATE OF CORRECTION

PATENT NO. : 4,869,770

DATED : September 26, 1989

INVENTOR(S) : Stephen Christensen; Dale E. Hartz

It is certified that error appears in the above-identified patent and that said Letters Patent is hereby corrected as shown below:

In claim 2, column 8, lines 8-9, delete "laminated" and substitute therefor --laminate--, line 17, delete "strops" and substitute therefor --strips--.

Signed and Sealed this

Twenty-fifth Day of September, 1990

Attest:

HARRY F. MANBECK, JR.

*Attesting Officer*　　　　*Commissioner of Patents and Trademarks*